United States Patent [19]
Timpe et al.

[11] 3,763,040
[45] Oct. 2, 1973

[54] PROCESSES FOR REDUCING THE ORGANIC-CARBON CONTENT OF WATER CONTAMINATED WITH ORGANIC COMPOUNDS BY CONTINUOUS COUNTERCURRENT MULTISTAGE TREATMENT WITH ACTIVATED CARBON

[75] Inventors: Winfried George Timpe, Pensacola; Edward Wilkerson Lang, Gulf Breeze, both of Fla.

[73] Assignee: The United States of America as represented by the Administrator of the Environmental Protection Agency, Washington, D.C.

[22] Filed: Aug. 13, 1971

[21] Appl. No.: 171,604

[52] U.S. Cl. .................................. 210/27, 210/40
[51] Int. Cl. ........................ B01d 15/02, C02c 5/02
[58] Field of Search .................. 210/18, 33, 39, 40, 210/189, 284, 27, 28

[56] References Cited
UNITED STATES PATENTS
3,244,621   4/1966   Bouthilet ..................... 210/33 X
2,545,239   3/1951   McQuiston et al. ............ 210/40 X
3,551,203   12/1970  Corson et al. ................. 210/39 X
3,635,817   1/1972   Zuckerman et al. ............ 210/40 X Primary Examiner—Samih N. Zaharna
Assistant Examiner—Thomas G. Wyse
Attorney—Benjamin H. Bochenek et al.

[57] ABSTRACT

Processes for the treatment of water that is contaminated with organic compounds, in which the contaminated water is subjected to a continuous countercurrent multistage treatment with particulate activated carbon in a plurality of tanks in each of which a high slurry density, for example, between 50 and 200 grams per liter of the slurry, is maintained. Particles of activated carbon, intermediate in size between those used heretofore in such processes for the reduction of the organic-carbon content of such wastewaters, are advantageously used in these processes. The processes are particularly useful for rendering industrial wastewaters suitable for resuse.

7 Claims, 1 Drawing Figure

PATENTED OCT 2 1973
3,763,040
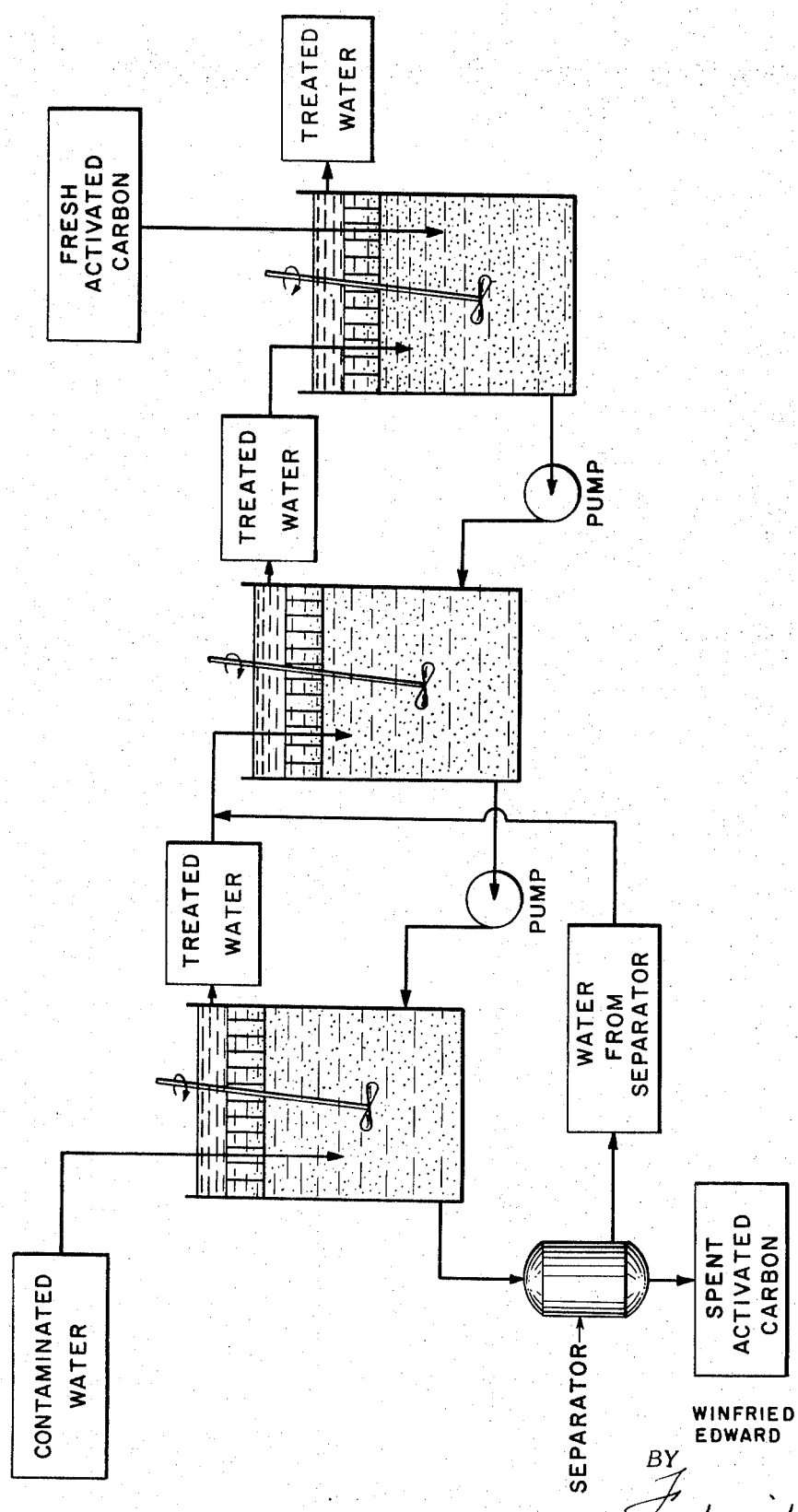
INVENTORS.
WINFRIED G. TIMPE &
EDWARD W. LANG
BY
Ferdinand E. Kopecky
their ATTORNEY

PROCESSES FOR REDUCING THE ORGANIC-CARBON CONTENT OF WATER CONTAMINATED WITH ORGANIC COMPOUNDS BY CONTINUOUS COUNTERCURRENT MULTISTAGE TREATMENT WITH ACTIVATED CARBON

The present invention pertains to processes for reducing the organic-carbon content of water containing or contaminated with organic compounds, particularly wastewater effluents from pulpmills and papermills, and similar industrial wastewaters which normally represent a serious disposal problem, by treatment with activated carbon.

The term "contaminated water" is used herein to refer to all such industrial wastewaters that contain organic compounds or organic substances that render them unsuitable for reuse and that consequently are potential sources of pollution, as well as other impure waters such as sea water or fresh waters from wells, ponds, rivers, lakes, and reservoirs that contain or have been contaminated with organic compounds and are not usable for industrial or other uses because of such contamination. Such contaminated waters can usually be rendered suitable for use or reuse solely by treatment in accordance with the processes of the present invention.

The term "organic carbon" as used herein refers only to carbon that is present as a constituent of an organic compound or substance and excludes carbon that is present as carbon dioxide or an inorganic salt of carbonic acid. The organic-carbon content is determined by conventional analytical methods, and is usually based upon the total carbon content (in milligrams per liter of water) determined by one method less the content of inorganic carbonate determined by another method.

Heretofore contaminated water has been subject to treatment with activated carbon particles to reduce its organic-carbon content in accordance with the following processes:

1. Powdered activated carbon is added to the contaminated water in a mixing tank and the resulting slurry is allowed to stratify in a settling tank from the bottom of which the settled spent carbon particles are withdrawn. In this process, the particles of activated carbon that are used generally are of such size that at least 95 percent pass through a No. 325 United States standard sieve in which the size of the openings is 44 microns or 0.0017 inch. 2. The contaminated water, from which suspended solid particles have preliminarily been separated, is charged continuously into and through one or more columns or filters filled with granular activated carbon, the particles of which generally pass through a No. 8 sieve in which the size of the openings is 2380 microns or 0.094 inch, but are retained on a No. 30 sieve in which the size of the openings is 595 microns or 0.023 inch.

Both of the foregoing processes have inherent disadvantages that it would be desirable to obviate. For example, in the first of the foregoing processes, in which powdered carbon is used, it is generally necessary to add coagulating or flocculating agents to effect a satisfactory settling and removal of the carbon particles or clarification of the treated water. Dewatering, drying, and regeneration of the spent carbon for recovery and reuse is difficult and costly, and the size and cost of the plant that is required for the treatment of the contaminated water with powdered carbon is large because of the low settling rates of powdered carbon particles.

In the second of the foregoing prior processes, which involves the use of a column of granular carbon particles, a large amount of activated carbon is required, which represents a high initial capital cost, to treat a preselected volume of the contaminated water at a preselected daily rate, because the rate of adsorption of the organic compounds on the granular carbon particles is small. Furthermore, because of the inherently high pressure drop through the column, the water must be forced through the column by mechanical pumps or other means to maintain an adequate flow rate. The columns eventually may become clogged with slime or similar biological growths and, unless all solid particles are preliminarily separated from the water by filtration or other means, they clog or plug the columns and retard or prevent the flow of liquids therethrough.

In the processes of the present invention, which are represented schematically in the accompanying drawing, the contaminated water whose total organic-carbon content may be as high as 500 or more milligrams per liter, is continuously charged to the first of a series of two or more tanks or stages in which a high slurry density of activated carbon, for example, between 50 and 200 grams per liter of slurry, is maintained. Such high slurry densities are used in order to provide maximum rates of adsorption, a minimum period of retention of the water being treated in the system, and minimal capital cost of plant.

Although three tanks or stages are represented in the schematic flow sheet of the drawing, the number of tanks and their individual capacities will be determined by the nature of the water that is to be treated and the level to which its organic-carbon content is to be reduced, and the degree to which the activated carbon is to be utilized before being regenerated or discarded.

The contaminated water is continuously agitated or stirred in each of the tanks to maintain the carbon particles in suspension.

The activated carbon that is used in the processes of the present invention is in the form of granules or powder consisting predominantly of particles that pass through a No. 40 United States standard sieve in which the size of the openings is 420 microns or 0.165 inch but are retained on a No. 200 standard sieve in which the size of the openings is 74 microns or 0.0029 inch, that is, particles of a size between 74 and 420 microns. Granular activated carbon consisting predominantly of particles that pass through a No. 60 standard sieve in which the size of the openings is 250 microns or 0.0098 inch but are retained on a No. 140 standard sieve in which the size of the openings is 105 microns or 0.0041 inch, that is, a granular activated carbon the particles of which are of a size within the more restricted range of 105 to 250 microns, is a preferred adsorbent for use in the processes of the present invention.

The sizes of the particles that are specified herein refer to and are to be understood to refer to the sizes of openings in United States standard sieves through which the particles have or have not passed and are based upon the results of screening tests in such sieves. A perfectly spherical particle would accordingly have a size corresponding to its diameter but, since most carbon particles are not perfect spheres, it is to be understood that the sizes specified refer only to the results of such screening tests and consequently may include random particles that passed lengthwise or along their greatest dimension, rather than side-wise or along their smallest dimension, through the sieve opening.

Fresh activated carbon particles are continuously charged into the last of the series of tanks or stages at a dosage or rate such that the total organic-carbon content of the incoming contaminated water is reduced to the preselected value. The spent carbon particles are withdrawn from the first of the tanks or stages in the series at substantially the same rate as fresh activated carbon is charged to the last tank or stage.

The tanks or stages are connected in such manner that the water can flow or be charged continuously from the first to the last tank or stage of the series and portions of the water containing dispersed carbon particles that are undergoing treatment in each of the tanks or stages can be withdrawn and charged counter-currently to the flow of the water from each tank to a preceding tank or stage in the series, as represented in the flow sheet of the drawing. Each tank or stage is provided with screens or baffles which create a clarification zone that retains or holds back carbon or other solid particles that are dispersed in the slurry and permits the treated water to flow out of that tank or stage to the next, or out of the last tank or stage, as a clear liquid essentially free of suspended carbon or other solid particles.

The contaminated water that is charged to the first tank or stage in the series is therein subjected to treatment with carbon that has been retained for the longest period in the system, while the treated water that is discharged from the last tank or stage comes into contact with fresh activated carbon as it is being charged into that tank or stage. In this manner the activated carbon is used most efficiently.

The required slurry density is maintained in the system by withdrawing continuously, from the first tank, portions of the slurry consisting of spent carbon particles and treated water in such amount or rate as to compensate for the freah activated carbon that is continuously being charged to the last tank. The spent carbon is separated from the withdrawn slurry by filtration or other means and the water that is thus withdrawn with the slurry is returned for further treatment to the first or another tank or stage in the series. In the drawing, the treated water from the separator is represented as being returned to the second tank but it can obviously be returned to any of the other tanks. The spent carbon that is withdrawn from the system in this manner can be regenerated or burnt as fuel.

The processes of the present invention are eminently suitable for reducing the organic-carbon content of effluent waters from pulpmills or papermills, for example, to as low as 50 milligrams or less per liter, by the use of two or more tanks in a counter-current system as disclosed herein, in which a slurry density of 50 to 200 grams of activated carbon of the specified particle sizes per liter of slurry is maintained, and in which the retention time of the effluent water in the system is between 5 and 120 minutes, and the fresh activated carbon is charged at a rate based upon the volume of the incoming water between 0.2 and 10 grams per liter of the water, and the retention time of the carbon in the system is between 1 and 100 hours.

If the total content of organic carbon in the incoming contaminated water or the rate at which the water is charged should change, suitable adjustments to compensate for these changes can easily be made in the dosage of fresh activated carbon that is continuously being charged, as well as in the dosage of spent carbon that is being continuously withdrawn. Changes in the slurry density, if required, also may be made independently by temporarily changing the rate of withdrawal of spent carbon from the first tank or stage of the series without changing the rate at which fresh activated carbon is charged to the last tank.

From the foregoing description it is apparent that the processes of the present invention offer distinct advantages over the two prior general processes that were referred to hereinbefore. Thus a much smaller amount of activated carbon is required in these processes than is required for treatment of the same volumes of contaminated water in the second of the two prior processes, as also referred to hereinafter, the amount of carbon that is used to produce a preselected reduction of the organic-carbon content of the contaminated water can be more easily controlled, and the size of the plant that is required can be reduced to one-half or less. No preliminary separation of the solid components of the contaminated water is required to prevent clogging or plugging of the columns as in the second of the two prior processes, and normally much less pumping force is required to transfer the slurry from one tank to another than is required to force the contaminated water through a column of granular carbon particles as in the second of the two prior processes. In comparison with the first of the two prior processes, the spent carbon is more readily separated from the treated water in the processes of the present invention, and it can be more readily regenerated because of its particle sizes.

The examples which follow have been selected to illustrate the processes of the invention in their simplest embodiments, namely, in laboratory-sized apparatus and operations. More suitable apparatus and procedures for adapting these processes to the plant-size operations that are described hereinbefore are based upon these examples.

EXAMPLE 1

The apparatus that is used in this and the following example consists of three glass beakers connected to each other in series as represented in the drawing. The beakers are placed or arranged in stepwise manner so that each beaker in the series is successively lower than the preceding beaker in order that the overflow water in the first beaker may flow by gravity through a tube into the second beaker, the overflow water from the second beaker into the third, and the overflow water from the third beaker may flow out of the system. Each of the beakers is provided with a stirrer and with a disc formed of a porous plastic foam material which is fixed near the top edge of the beaker and serves as a baffle to hold back and permit the carbon particles to settle and prevent them from being carried out of the beaker with the water flowing out of the beaker into the next beaker in the series. Although a filter might be used for this purpose, it would unduly and unnecessarily decrease the flow rate of the water through the apparatus.

At preselected intervals, preselected measured volumes of slurry containing dispersed carbon particles are withdrawn from each of the beakers by means of a pipette and transferred to a preceding beaker in the series while an equivalent weight of fresh activated carbon particles is introduced into the third and last beaker of the series to replace the carbon that was withdrawn from that beaker when the preselected measured volume of slurry was withdrawn therefrom at that interval. In this manner, a constant density of carbon particles in the aqueous slurry is maintained in each beaker and a continuous flow of the treated water is maintained in the system. The preselected measured volume of slurry that is withdrawn from the first beaker in the series at each interval is transferred to a filter or similar means for separating solids from liquids in which the spent carbon particles are separated from the water and the filtered or clarified water is returned to the first beaker of the series with the incoming water that is to be treated.

At the start of this example, each beaker contained 160 grams of fresh activated carbon particles dispersed in 1610 milliliters of water, corresponding to a slurry density of 99.4 grams of carbon per liter. The slurry in each of the beakers is continuously stirred during the treatment.

The carbon that was used was granular Darco-brand activated carbon obtained from Atlas Chemical Company of Wilmington, Del., that was further crushed and screened so that it contained particles only of such sizes as to pass through a No. 60 standard sieve and be retained on a No. 140 standard sieve, namely, particles having sizes between 105 and 250 microns.

In this example, a kraft mill effluent water having a total organic-carbon content of 220 milligrams per liter and a color corresponding to 1020 APHA color units per liter was continuously charged into first of the three beakers at a rate of 7700 milliliters per hour while the contents of each of the beakers was stirred. This effluent water was passed through each of the three beakers in turn and the treated water was discharged from the third and last beaker in the series at the same rate as the untreated water was charged into the first beaker. The retention time of the water in the system was accordingly 36 minutes.

The color of the water is referred to herein in terms of APHA color units per liter which are determined by the method described on page 192 of the book "Standard Methods for the Examination of Water and Wastewater," published jointly by the American Public Health Association, American Water Works Association, and the Water Pollution Control Federation, New York, 12th Edition, 1965, available from American Public Health Association, 1790 Broadway, New York, N.Y., 10019. In accordance with this method, a decrease in the number of color units per liter represents a lightening of the color of the water.

At 30-minute intervals, 160 milliliter portions of slurry containing 16 grams of carbon dispersed therein was withdrawn with a pipette from each beaker and transferred to a preceding beaker, as described hereinbefore, the portion that was withdrawn from the first beaker in the series being transferred to a filter and treated as hereinbefore described, while 16 grams of fresh activated carbon was introduced into the third and last beaker in the series at each 30-minute interval. The retention time of the carbon in the system was accordingly 15 hours.

After equilibrium had been established in each of the three beakers in the series, it was found that the water in each had the following characteristics:

|  | Total organic carbon, milligrams per liter | APHA color units per liter |
| --- | --- | --- |
| Untreated Water | 220 | 1020 |
| Beaker 1 | 139 | 480 |
| Beaker 2 | 87 | 226 |
| Bekaer 3 | 55 | 105 |

EXAMPLE 2

In the same apparatus and manner as described in Example 1, a similar kraft mill effluent water having a total organic carbon content of 220 milligrams per liter and a color equivalent to 1100 APHA color units per liter was treated with activated carbon, the particles of which passed through a No. 40 standard sieve and were retained on a No. 100 standard sieve, namely, particles having sizes between 149 and 420 microns.

The kraft mill effluent water was charged at the rate of 2880 milliliters per hour, corresponding to a retention time of 102 minutes, and 6.75 grams of fresh activated carbon particles were charged at each 30-minute interval to the third beaker in the series, corresponding to a retention time of 35 hours in the system.

The characteristics of the water in each of the three beakers in the series, after equilibrium had been established in each, were as follows:

|  | Total organic carbon, milligrams per liter | APHA color units per liter |
| --- | --- | --- |
| Untreated Water | 220 | 1100 |
| Beaker 1 | 130 | 483 |
| Beaker 2 | 77 | 213 |
| Beaker 3 | 45 | 90 |

Although the results of the different treatments in Examples 1 and 2 were essentially the same, it should be noted that the retention time of the carbon in the system in Example 2, namely, 35 hours, was 2.34 times the retention time of 15 hours of the carbon in Example 1, and that consequently 2.34 times more carbon was required within the system to produce substantially the same reduction of the organic-carbon content of the effluent water. In comparison, approximately 83.3 times the amount of carbon that was in the system in Example 1 to produce the desired reduction of organic-carbon content to 50 milligrams per liter was required to be present when a substantially identical kraft mill effluent water was treated in a carbon column containing activated carbon particles of such sizes as to pass through a No. 8 standard sieve but to be retained on a No. 30 standard sieve, namely, particles having sizes between 595 and 2380 microns, in which process the retention time of the water in the column was 12 hours and the retention time of the carbon was 1250 hours.

Since we have found that most kraft papermill effluent waters have a hydrogen-ion concentration equivalent to a pH value of 8.5 and that, at this pH value, the adsorption rate of the organic compounds on activated carbon appears to be optimal, it accordingly may be desirable preliminarily to adjust the hydrogen-ion concentration of contaminated waters by conventional means to obtain an optimal adsorption rate before subjecting the contaminated water to treatment with carbon in accordance with the processes of this invention.

We have also discovered that, when contaminated water is preliminarily treated with calcium hydroxide before treatment with activated carbon in accordance with the process of this invention, certain additional advantages may be achieved. For example, when calcium hydroxide is added in an amount corresponding to 200 milligrams of $Ca(OH)_2$ per liter to water containing 260 milligrams of organic carbon per liter that required 5 grams of activated carbon per liter to reduce its organic-carbon content to 90 milligrams per liter in accordance with the processes of this invention in the absence of calcium hydroxide, only 1.5 grams of activated carbon per liter was required to achieve the same reduction of its organic-carbon content to 90 milligrams per liter. Comparable improvements are achieved when between 100 and 600 milligrams of calcium hydroxide (calculated as $Ca(OH)_2$) per liter is added to such contaminated waters prior to treatment with activated carbon in accordance with the processes of this invention. The contaminated water to which calcium hydroxide is added in this manner may be subjected directly to treatment with activated carbon or the suspended solids that are precipitated in this manner upon addition of the calcium hydroxide may be preliminarily separated by filtration, sedimentation, or other conventional means.

When greater proportions of calcium hydroxide are added to the contaminated water, namely, up to 20,000 milligrams of calcium hydroxide calculated as $Ca(OH)_2$ per liter, and the precipitated solids are separated therefrom the resulting liquid is generally clearer than that obtained when smaller amounts of calcium hydroxide as specified hereinbefore are used. Such clarified water is susceptible to treatment with activated carbon in accordance with the processes of the present invention with the same advantages that are obtained when smaller amounts of calcium hydroxide are used. However, the treated water, which normally has a lower organic-carbon content, contains substantial proportions of dissolved calcium hydroxide which renders it unusable for some purposes. The dissolved calcium hydroxide may be precipitated and separated from the water as calcium carbonate by reaction with carbon dioxide and filtration, however, and thus the water may be recovered for reuse, for example, in pulpmills and papermills. The precipitated calcium carbonate, as well as solids or sludge that precipitated when the calcium hydroxide was added before treatment with activated carbon, can be calcined to calcium oxide, which can be reused in this process or be used to regenerate sodium hydroxide for use in subsequent pulping processes.

Inasmuch as the foregoing description comprises preferred embodiments of the invention which were selected solely for purposes of illustration, it is to be understood that the invention is not limited thereto, and that modifications and variations may be made therein without departing from its scope, which is to be limited only by the appended claims.

The embodiments of the invention in which an exclusive property or privilege is claimed are defined as follows:

1. A continuous process for reducing the organic-carbon content of a water contaminated with organic compounds which comprises
   a. continuously charging the contaminated water into the first of a plurality of tanks while
   b. simultaneously and continuously charging fresh powdered activated carbon consisting predominantly of particles of sizes between 74 and 420 microns into the last of the series of tanks at such a rate that a slurry density between 50 and 200 grams of activated carbon per liter is maintained in each of the tanks,
   c. continually stirring the slurry of carbon particles in water in each of the tanks,
   d. continuously withdrawing portions of the contents of each of the tanks substantially free from solid particles and charging each portion successively into a consecutive tank of the series,
   e. continuously withdrawing the treated water substantially free from solid particles from the last tank of the series,
   f. continuously withdrawing from each of the tanks portions of the slurry consisting of solid particles of partially or completely spent activated carbon dispersed in the treated water and charging each portion successively into a preceding tank of the series, and
   g. continuously withdrawing a portion of the slurry in the first of the series of tanks consisting of solid particles of partially or completely spent activated carbon dispersed in the water at a rate such as to compensate for the fresh activated carbon particles that are being continuously charged to the last tank of the series and thereby maintain the preselected slurry density of carbon particles throughout the series of tanks.

2. A process as defined in claim 1 in which the spent carbon particles are separated from the portions of the slurry consisting of carbon particles and contaminated water undergoing treatment that are continuously being withdrawn from the slurry in the first of the series of tanks and subsequently returning the water from which the carbon particles have been separated to one of the tanks in the series.

3. A process as defined in claim 1 in which the activated carbon particles have sizes between 105 and 250 microns.

4. A process as defined in claim 1 in which the contaminated water that is being charged to the first of the plurality of tanks is preliminarily treated by the addition of calcium hydroxide thereto.

5. A process as defined in claim 1 in which the contaminated water that is being charged to the first of the plurality of tanks is preliminarily treated by the addition of calcium hydroxide thereto in an amount equivalent to between 100 and 600 milligrams (calculated as $Ca(OH)_2$) per liter.

6. A process as defined in claim 1 in which the contaminated water that is being charged to the first of the plurality of tanks is preliminarily treated by the addition of calcium hydroxide thereto and the precipitated solids are separated therefrom.

7. A process as defined in claim 1 in which the hydrogen-ion concentration of the contaminated water that is being charged to the first of the plurality of tanks is preliminarily adjusted to a pH value of approximately 8.5.

* * * * *